K. E. PEILER.
MANUFACTURE OF GLASSWARE.
APPLICATION FILED JUNE 24, 1915.

1,222,243.   Patented Apr. 10, 1917.

Witness:
J. S. Grotta

Inventor:
Karl E. Peiler
by W. H. Honiss
Atty.

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

MANUFACTURE OF GLASSWARE.

1,222,243.      Specification of Letters Patent.      Patented Apr. 10, 1917.

Application filed June 24, 1915. Serial No. 36,082.

*To all whom it may concern:*

Be it known that I, KARL E. PEILER, a citizen of the United States, residing at Hartford, in the county of Hartford and State of Connecticut, have invented new and useful Improvements in Manufacture of Glassware, of which the following is a specification.

This invention is an improved method of and apparatus for severing gathers or charges of molten glass from a supply of glass in a tank, gathering pool, or other container. On account of the viscous character of molten glass, it is extremely difficult, as is well known, to separate it cleanly into compact and smooth charges or gathers of uniform size, suitable for converting into usable glassware. In "gathering" or otherwise drawing one mass away from the other, a connecting neck is formed, which unless cleanly and promptly severed is liable to be drawn out into extended tough stringy cords or threads, which, becoming rapidly chilled and less plastic than the associated mass, form scars or marks on the resulting glassware.

The common practice now is to separate these connecting necks or cords of glass by means of metallic blades, which, however, leave chills on both of the severed surfaces, due to the rapid transmission of heat from those surfaces to the severing means. These chills appear as scars in the finished glassware. These chills not only occur on the gathering mass of glass, but a similar chill is also left on the surface of the pool of glass from which the gather is separated. In making successive gathers from the same pool, these chills must be avoided until they have time to become reheated and thus reabsorbed into the pool of glass.

The principal object of the present invention is to sever such gathers of molten glass without leaving chills or scars either on the gather itself, or on the gathering pool. This is accomplished by passing an electric current through the column or stream of glass either while forming, or after forming a reduced neck approximately where the glass is to be severed. The effect of the current is to melt and pinch off the column or stream of glass smoothly, before the connecting neck can be drawn out into extended threads or cords.

Figure 1:
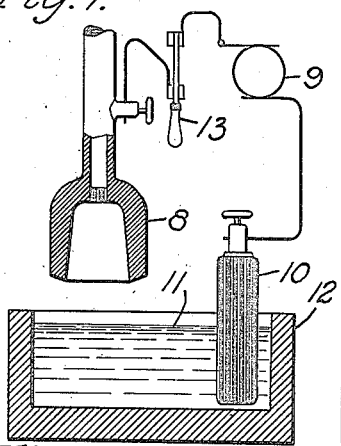
Figure 2:
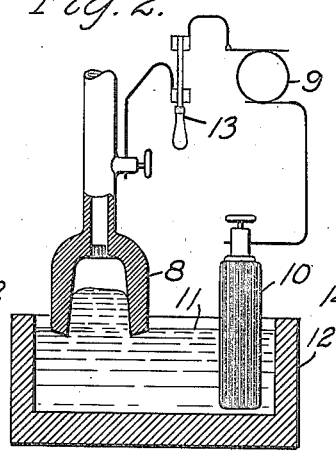
Figure 3:
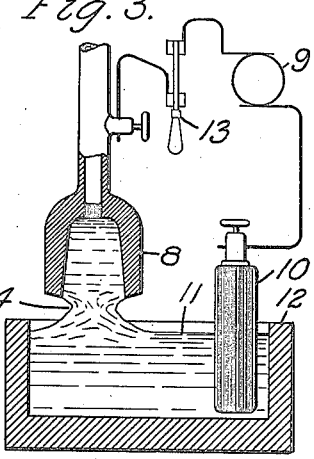
Figure 4:
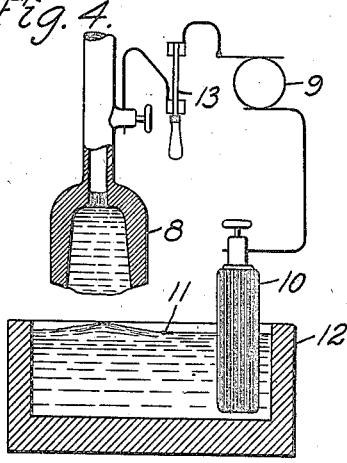
Figure 5:
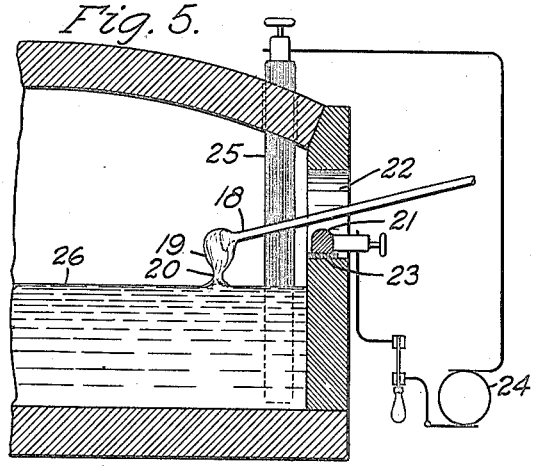
Figure 6:
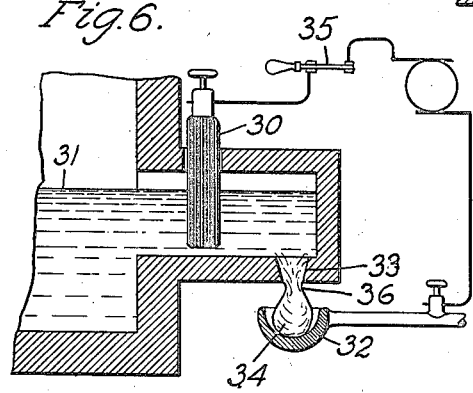
Figure 7:
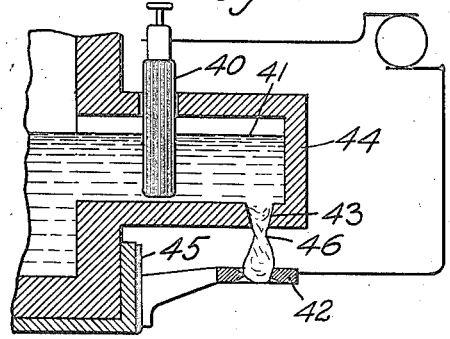

Figures 1 to 4 inclusive are elevations illustrating in a diagrammatic way the application of the present method to the gathering of glass by suction devices. Fig. 5 illustrates the employment of the present method in connection with a hand gathering rod or punty. Fig. 6 illustrates an application of the method where the molten glass flows through an orifice at the bottom or beneath the surface of a gathering pool into a ladle or transfer cup. Fig. 7 illustrates another application of the method to a glass delivery similar to that of Fig. 6.

In the employment of this method as illustrated in Figs. 1 to 4 inclusive, a suction gathering head 8 of any approved form is employed, and is connected in an electric circuit, comprising a generator 9, and an electrode 10 inserted in the glass 11 in the forehearth 12. A switch 13 is also preferably employed. The gathering head 8 is lowered from the position shown in Fig. 1 to that of Fig. 2 into contact with the glass, which is raised by the suction to the head, after which the latter is raised to the position of Fig. 3, thus by its drawing away action forming a reduced neck at 14. The heating effect of the electric current passing through the glass is intensified at the reduced neck, increasing the plasticity of the glass at this point, and thereby accelerating the reduction of the neck, which in turn still further increases the heating effect. Superadded to this heating effect of the electric current is an electro-magnetic effect known as the "pinch effect." This is due to the tendency of an electric conductor to reduce its cross-section to the smallest possible amount. Under the combined influence of the heat, the electro-magnetic "pinch effect" and the weight of the column of glass, the neck is quickly reduced to the point of complete severance, leaving the gather and the surface of the pool in the smooth condition shown in Fig. 4. Instead of the chill which would be left on the surface of the gather and of the pool if a metallic knife or shears were used for severing, the temperature of the glass at the severed areas is higher than before the severing operation, with the result that the raised surfaces are smoothly reabsorbed into their respective masses, without any threads or strings, or resultant scars. In some cases it may be found preferable to leave the switch open while gathering, and then close the circuit when ready to sever.

In Fig. 5, a punty 18 is employed in the well-known way for rolling or winding up a gather 19 of the glass. When a sufficient amount has been gathered and raised to form a neck 20, the punty is lowered into electric contact with a contact bar, or block 21, supported on the sill of the gathering opening 22. The bar is insulated as at 23, from the sill, and is connected in circuit with a generator 24 or other source of electric energy, the other end of the circuit terminating in an electrode 25 projecting into the supply of glass 26. When contact is thus made between the punty and the contact bar the electric current passing through the punty operates upon the neck 20 of glass as above described in connection with the previous figures, to heat and pinch off the glass smoothly at the neck.

In the modification shown in Fig. 6, the electric circuit having at one end the electrode 30 resting in the glass 31, is connected at its opposite end to a ladle or transfer cup 32, which receives the glass flowing from the orifice 33. The ladle may be placed at different heights, according to the size of drop or gather desired; and the circuit may be completed by the gather 34 coming in contact with the ladle, the switch 35 in that case being left closed all of the time. Or the circuit may be controlled by opening and closing the switch, this being a matter of detail depending upon the circumstances or conditions of use. The electric current operates in the way previously described to sever the glass smoothly at the neck 36; and the ladle or cup 32 after emptying the severed charge or gather is returned to position in time to catch the succeeding drop or gather which has meanwhile been forming.

In the modification shown in Fig. 7 the electric circuit connected at one end with the electrode 40 resting in the glass 41 is connected at its other end to a ring 42 disposed centrally beneath the orifice 43 through which the glass flows from the tank or forehearth 44. The ring is insulated as shown at 45 from its support, which may be the front wall or any convenient portion of the furnace. The circuit is closed by the accumulating gather of glass coming in contact with the ring, whereupon the previously described heating and severing action is set up at the neck 46. The complete severance of the neck breaks the circuit, and the severed gather falls through the ring into a suitable mold or ladle or transfer cup. Similarly, the succeeding drops or gathers flow from the orifice, reach the ring, and are cut off. The ring serves, in effect, as an automatic switch.

The different applications of this invention herein shown and described are only a few of its possible applications to various types or forms of glass gathering methods and apparatus. The invention is adapted to apparatus operated either by hand, or by machinery of more or less automatic character. The gathering heads, punties, ladles, switches, and other members may be operated by suitable cams or other devices in proper time relation to each other, and to the glass shaping machinery with which they may be employed.

I claim as my invention:—

1. The method of severing molten glass, which consists in forming a reduced neck in the glass and passing an electric current through the neck lengthwise thereof.

2. The method of severing a column of molten glass which consists in reducing its cross-section approximately at the desired point of severance, and passing an electric current lengthwise through the column and the said reduced portion.

3. The method of separating a gather of molten glass from a supply of the glass, which consists in forming a reduced neck in the glass between the gather and its supply, and passing an electric current through the neck lengthwise thereof.

4. The method of detaching a gather from a supply of molten glass, which consists in partly separating the gather from the supply, leaving a connecting neck of reduced cross-section between them, and passing an electric current lengthwise of the connecting neck from the gather to the supply, or vice versa.

5. The method of forming and separating successive gathers of molten glass from a supply of such glass, which consists in partly detaching the successive gathers from the supply to form a reduced neck between them, and passing an electric current through the said neck lengthwise thereof.

6. The method of severing masses of molten glass from each other, which consists in forming a reduced neck between the masses and passing an electric current through the said neck from one mass to the other.

7. The method of severing gathers of molten glass, which consists in suspending a column of the glass, utilizing the weight of the lower portion of the column to form a reduced neck in the column, and passing an electric current vertically through the said neck.

8. The method of severing gathers of molten glass from a supply of glass, which consists in holding a portion of the glass in suspension and thereby forming a reduced neck in the glass, and passing an electric current vertically through the said neck.

9. Apparatus for separating gathers from a supply of molten glass, including means for forming a reduced neck between the gather and the supply, and an electric circuit having electrodes in contact with the gather and the supply, whereby the current is passed from one to the other through the neck.

10. Apparatus for separating gathers of glass from a supply of molten glass, including in combination means for partly separating the gathers from the supply, thereby reducing the cross-section of the connecting glass, an electric circuit, and electrodes in the circuit in contact with the gather and the supply.

11. Apparatus for separating gathers of glass from a supply of molten glass, including in combination an electric circuit, electrodes in the circuit, one of which is disposed in contact with the supply, and means for flowing the glass in successive masses from the supply into contact with the other electrode, with a reduced neck of glass between each successive mass and the supply, whereby the reduced neck is melted by the heat of the current.

12. Apparatus for separating molten glass into gathers, including in combination a glass gathering implement, an electric circuit electrically connecting the said implement with the supply of glass, means for operating the said implement to gather and withdraw a mass of glass from the said supply, and switch devices for opening and closing the circuit in time relation to the operations of the gathering implement.

Signed at Fairmont, West Virginia this 21st day of June, 1915.

KARL E. PEILER.